US011987438B2

(12) United States Patent
Surjaatmadja et al.

(10) Patent No.: US 11,987,438 B2
(45) Date of Patent: May 21, 2024

(54) STORAGE, TRANSPORT, AND DELIVERY OF WELL TREATMENTS

(71) Applicant: Halliburton Energy Services, Inc., Houston, TX (US)

(72) Inventors: Jim B. Surjaatmadja, Duncan, OK (US); Tim H. Hunter, Duncan, OK (US); Stanley V. Stephenson, Duncan, OK (US); Thomas M. Logan, Norman, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 1009 days.

(21) Appl. No.: 16/770,046

(22) PCT Filed: Feb. 23, 2018

(86) PCT No.: PCT/US2018/019478
§ 371 (c)(1),
(2) Date: Jun. 4, 2020

(87) PCT Pub. No.: WO2019/164511
PCT Pub. Date: Aug. 29, 2019

(65) Prior Publication Data
US 2020/0346842 A1 Nov. 5, 2020

(51) Int. Cl.
*E21B 21/06* (2006.01)
*B01F 35/71* (2022.01)
(Continued)

(52) U.S. Cl.
CPC .... *B65D 83/0055* (2013.01); *B01F 35/71745* (2022.01); *E21B 21/062* (2013.01); (Continued)

(58) Field of Classification Search
CPC .............. E21B 21/062; B65D 83/0055; B65D 2217/04
See application file for complete search history.

(56) References Cited

U.S. PATENT DOCUMENTS 4,569,394 A * 2/1986 Sweatman ............ E21B 43/267 166/309
4,718,932 A 1/1988 Adams, Jr.
(Continued)

FOREIGN PATENT DOCUMENTS

WO 2009-154468 A1 12/2009
WO WO-2013014434 A2 * 1/2013 ........... E21B 21/003
(Continued)

OTHER PUBLICATIONS

International Search Report and Written Opinion dated Nov. 20, 2018; International PCT Application No. PCT/US2018/019478.

*Primary Examiner* — Matthew R Buck
(74) *Attorney, Agent, or Firm* — Barnes & Thornburg LLP

(57) ABSTRACT

Provided are methods and systems for delivering a treatment fluid to a wellsite. An example method includes receiving a container containing a treatment fluid component from a treatment fluid component supplier. The method further includes introducing the treatment fluid component into a wellbore from the container by pumping the treatment fluid component out of the container and into the wellbore. The treatment fluid component is not transferred to another container during the receiving or the introducing.

20 Claims, 11 Drawing Sheets

(51) Int. Cl.

| | |
|---|---|
| ***B65D 83/00*** | (2006.01) |
| ***E21B 41/00*** | (2006.01) |
| *B01F 23/50* | (2022.01) |
| *B01F 33/80* | (2022.01) |
| *B01F 101/49* | (2022.01) |

(52) U.S. Cl.

CPC .............. *E21B 41/00* (2013.01); *B01F 23/50* (2022.01); *B01F 23/59* (2022.01); *B01F 33/8051* (2022.01); *B01F 35/71731* (2022.01); *B01F 2101/49* (2022.01); *B65D 2217/04* (2013.01)

(56) References Cited

U.S. PATENT DOCUMENTS 5,899,272 A * 5/1999 Loree ...................... E21B 43/26 166/280.2
9,617,810 B2 * 4/2017 Smith ..................... E21B 21/02
2009/0114391 A1 * 5/2009 Smith, IV ............... E21B 37/06 166/305.1
2009/0301725 A1 12/2009 Case et al.
2012/0085541 A1 * 4/2012 Love ................... E21B 43/2607 166/308.1
2013/0105166 A1 5/2013 Medvedev et al.
2014/0000720 A1 1/2014 Mortzheim et al.
2014/0151049 A1 6/2014 Sanborn et al.
2014/0174747 A1 6/2014 Kelly et al.
2014/0216736 A1 8/2014 Leugemors et al.
2015/0060044 A1 3/2015 Scharmach et al.
2015/0060065 A1 3/2015 Scharmach et al.
2015/0204166 A1 7/2015 Sanborn et al.
2016/0084044 A1 3/2016 Shen et al.
2016/0245045 A1 * 8/2016 Burnette ............... E21B 21/062
2017/0356586 A1 * 12/2017 Weinstein ........... E21B 43/2607

FOREIGN PATENT DOCUMENTS

WO 2017-014771 A1 1/2017
WO 2017-173192 A1 10/2017

* cited by examiner

STORAGE, TRANSPORT, AND DELIVERY OF WELL TREATMENTS

TECHNICAL FIELD

The present disclosure relates to storage, transport, and delivery methods and systems for well treatments, and more particularly, to the use of specialized reusable containers that may be used to store, transport, and deliver a specific well treatment fluid or solid from a supply location into the well and then be resupplied at said supply location without transfer of the well treatment fluid or solid into another container.

BACKGROUND

Many wellbore processes involve pumping various treatment fluids into a wellbore to treat a subterranean formation. These treatment fluids may comprise a number of components, each serving one or more particular functions to produce a treatment fluid sufficient for conducting a specific wellbore operation. Accordingly, it is necessary to deliver, store and properly prepare such treatment fluids and their respective components.

Moreover, many of the treatment fluid components may have harsh, corrosive, and/or abrasive properties, making their handling difficult and potentially harmful to equipment and personnel.

Treatment fluids can comprise a variety of components. For example, treatment fluids may comprise aqueous or oil base fluids, gelling agents, cross-linkers, breakers, buffering agents, proppants, diversion materials, acidizing materials, as well as other components. Accordingly, proper equipment is required to handle, mix, and deliver such materials downhole. Storing and transporting these materials requires detailed and time-consuming logistics management. Some of the components are sent by the supplier to a discrete coordinating location, generally not the wellsite, where the individual component may be packaged and allocated for a wellsite operation before transport to the specific wellsite where it will be used. The wellsite then has to store the packaged components until needed. If additional amounts of the components are needed, the wellsite operator may have to request these amounts from the packaging center that in turn may have to request these amounts from the treatment fluid component suppliers. The containers in which the components are transported are often not reused. Further, reusable containers will require cleaning if they have been contaminated with other treatment fluid components in order to prevent cross-contamination.

As such, the packaging, storing, transporting, and delivering of treatment fluid components and treatment fluids increases overall operational expenditures and may have an impact on productive time if said components are not efficiently delivered to a wellsite.

BRIEF DESCRIPTION OF THE DRAWINGS

Illustrative examples of the present disclosure are described in detail below with reference to the attached drawing figures, which are incorporated by reference herein, and wherein.

Figure 1A:
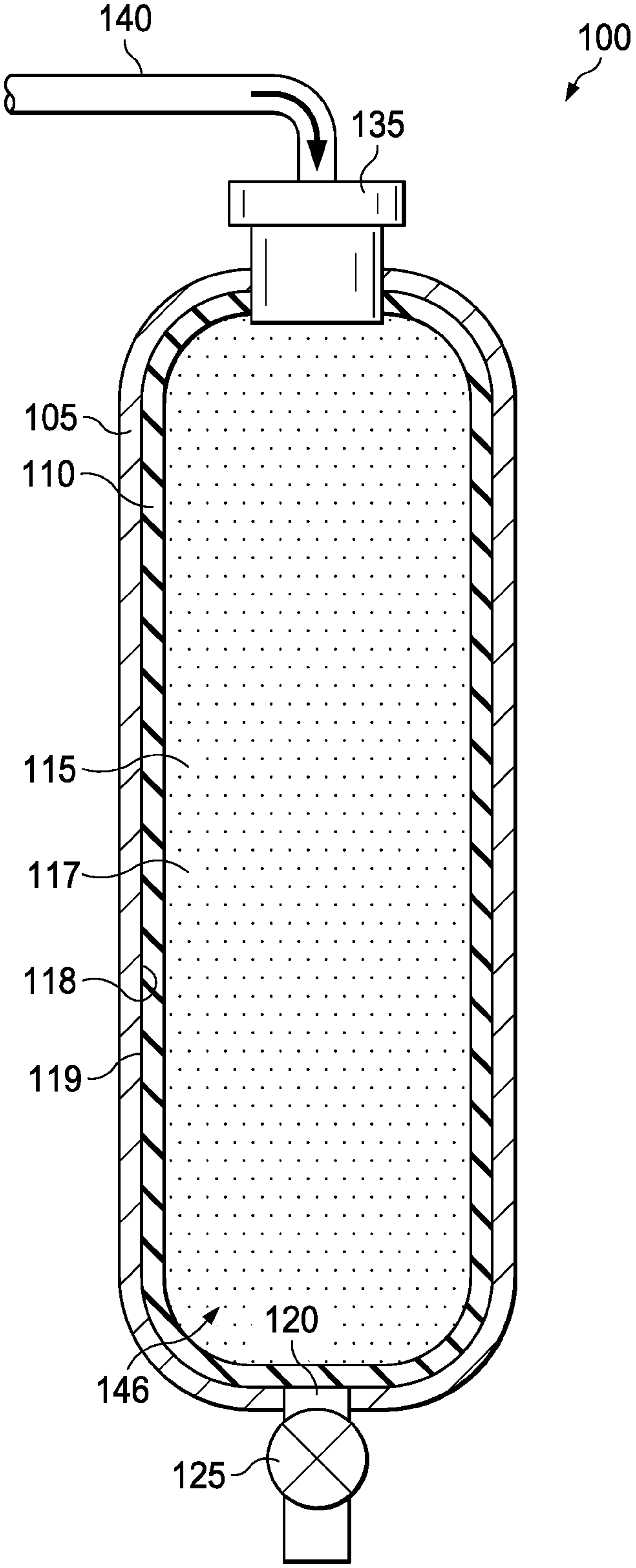
FIG. 1A is a schematic of a container in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates to storage, transport, and delivery methods and systems for well treatments, and more particularly, to the use of specialized reusable containers that may be used to store, transport, and deliver a specific well treatment fluid or solid from a supply location into the well and then be resupplied at said supply location without transfer of the well treatment fluid or solid into another container.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Treatment fluids can be employed in a variety of subterranean operations. As used herein, the terms "treatment," "treating," and other grammatical equivalents thereof refer to any subterranean operation that uses a fluid in conjunction with performing a desired function and/or for achieving a desired purpose. The terms "treatment," "treating," and other grammatical equivalents thereof do not imply any particular action by the fluid or any component thereof. Example treatment fluids may include, for example, drilling fluids, fracturing fluids, cements, workover fluids, completion fluids, and the like. Treatment fluid component," as used herein refers to one or more components used to formulate a completed treatment fluid and may, in some examples, refer to the completed treatment fluid composition itself.

Examples of the methods and systems described herein relate to the storage, transport, and delivery of containers having a generally tubular body and enclosing an internal cavity for containing fluids or solids. These containers comprise an inert flexible bladder which lines the internal cavity such that when a treatment fluid component is added, the bladder of the internal cavity protects the surface and prevents contact by the treatment fluid component with the environment. In order to pump out the treatment fluid component contained in the container within the flexible bladder, a metering fluid is pumped through a metering aperture of the container on the other side of the inert flexible bladder. Accordingly, as the metering fluid is pumped in, the flexible bladder collapses and the treatment fluid component is correspondingly forced out of the mouth of the container. The metering fluid then fills the space formerly taken by the treatment fluid component, but behind the flexible bladder, and contacts the surface of the internal cavity. Thus, the treatment fluid component is precisely metered out of the mouth of the container due to its displacement by the metering fluid.

Accordingly, the metering pump and internal surface of the container is exposed only to the treatment fluid component thereby preserving the pumping equipment. Furthermore, the treatment fluid components, which may be corrosive and/or abrasive, are kept behind the inert flexible bladder. The treatment fluid components do not interact with the metering pumps. Moreover, the containers can be delivered already filled and/or re-used with the same treatment fluid components so as avoid contamination.

A plurality of containers may be combined together to meter out the treatment fluid components to a common line. In this way the treatment fluid components may be mixed together or with a base fluid as they are metered out. Further, they may be pumped to an active mixer and then downhole. Alternatively, they may be pumped downhole without any intervening active mixer, with only a static mixer. This way, the treatment fluid components can be delivered, stored, and metered out accurately and efficiently without contamination from the external environment.

Advantageously, these containers may be sent directly to a coordinating location or directly to a wellsite with an already mixed and prepared treatment fluid within. Alternatively, the containers may comprise one or more treatment fluid components which may be used to prepare a completed treatment fluid at the coordinating location or the wellsite. The containers may be prepared to contain a specific treatment fluid or treatment fluid component(s), and as such may be sent directly to a supplier of the coordinating location to be refilled and reused without the need to clean and without the risk of cross-contamination. Further advantageously, the containers may be transported, stored, and delivered to the coordinating location and/or the wellsite without transfer of the treatment fluid or component(s) to a new/different container and also without the need to repackage the treatment fluid components from the supplier for use at a wellsite. As such, the treatment fluid or treatment fluid component(s) may be pumped directly out of the container and into the wellbore via the pumping/mixing equipment without transfer of the treatment fluid or treatment fluid component(s) to any other container during the supply, transport, and delivery operations.

Figure 1B:
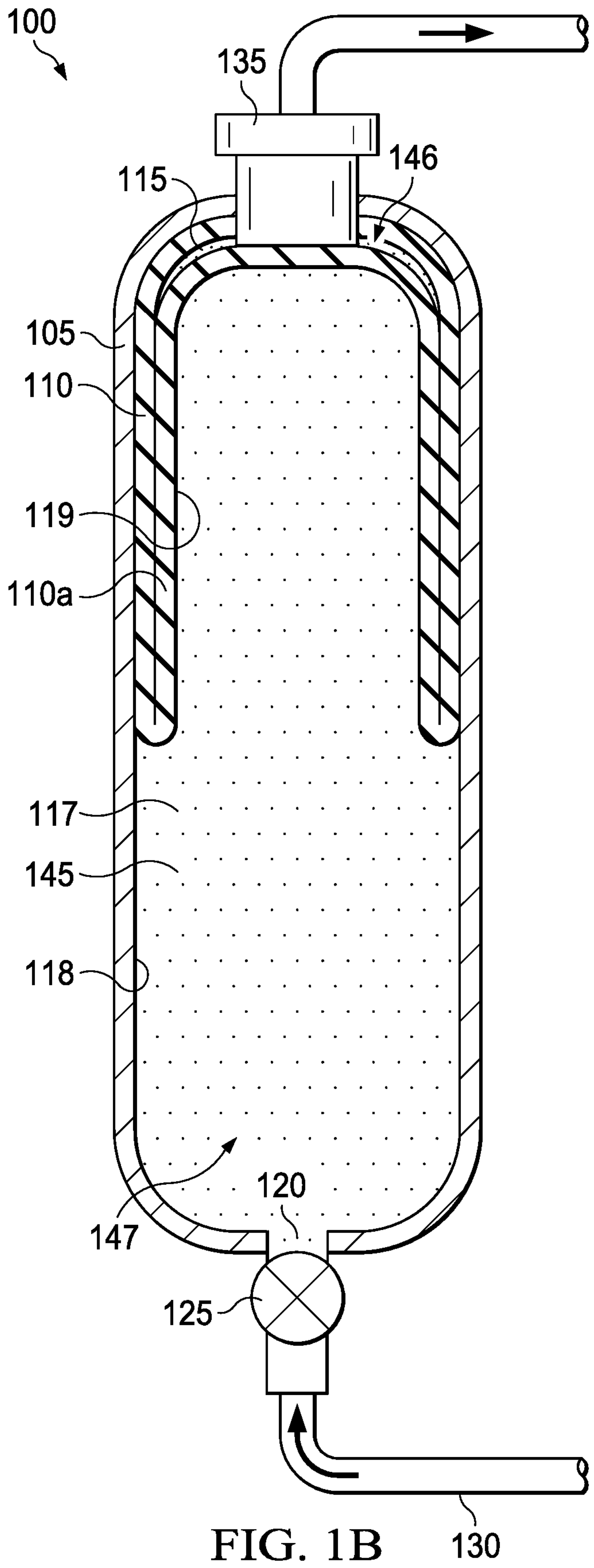
FIG. 1B is a schematic of the container of FIG. 1A after the emptying of its contents in accordance with one or more examples described herein.

Illustrated in FIGS. 1A and 1B is a schematic of a container 100 in accordance with one or more examples described herein. As shown in FIG. 1A the container 100 has a container body 105. The container body 105 may have an internal cavity 117 for containing fluids and solids. The container body 105 may be any shape, and may be made of any sufficient material for containing fluids and/or solids at high pressures, including, but not limited to, metals and metal alloys such as steel, plastics, composite materials such as fiber glass (e.g., wound and/or woven), or combinations thereof. For instance, the container body 105 may have a pressure rating of about 10 psi to about 1000 psi, alternatively from about 100 psi to about 500 psi, or further alternatively from about 300 psi to about 400 psi, encompassing any value and subset therebetween. An inert flexible bladder 110 is provided within the internal cavity 117 and may be expandable or non-expandable. The inert flexible bladder 110 separates the internal cavity 117 of the container body 105 into two portions, a treatment fluid component portion 146 and a metering fluid portion 147. A mouth 135 is provided at an end of the container body 105 and passes through the container body 105 to the treatment fluid component portion 146 of internal cavity 117 permitting fluidic communication for receiving and discharging a treatment fluid component 115. The mouth 135 may have a valve in order to fluidically couple a line 140 from a truck or other external tank to receive the treatment fluid component 115 under pressure and/or without exposure to the environment. Although the mouth 135 is illustrated at the top of container 100, it is to be understood that some containers 100 may be reversed in their orientation, and the mouth 135 may be located at the bottom of container 100. The container body 105 may also comprise a metering aperture 120 passing through the container body 105 to the metering fluid portion 147 of the internal cavity 117 permitting fluidic communication for receiving a metering fluid 145.

The metering fluid portion 147 of the internal cavity 117 is formed by the border of a container surface 118 of the container body 105 and the outer surface 119 of the inert flexible bladder 110 facing the metering aperture 120. Likewise, the treatment fluid component portion 146 of the internal cavity 117 is formed by the border of the inert flexible bladder 110 facing the mouth 135. The treatment fluid component portion 146 will expand when the treatment fluid component 115 is provided through mouth 135, and contract as a metering fluid 145 is metered through the metering aperture 120. Likewise, the metering fluid portion 147 expands as a metering fluid 145 is metered through the metering aperture 120 and contracts when a treatment fluid component 115 is injected through the mouth 135 and/or a metering fluid 145 is extracted from metering aperture 120.

Accordingly, the inert flexible bladder 110 serves as a barrier between the mouth 135 and the metering aperture 120 so as to separate the treatment fluid component 115 input through mouth 135 from the metering fluid 145 input from metering aperture 120. The inert flexible bladder 110 is made such that it is inert and non-reactive to any chemicals which may be in the treatment fluid component 115 or metering fluid 145. As illustrated in FIG. 1A, the inert flexible bladder 110 may serve as a liner covering the container surface 118 of the metering fluid portion 147. When a treatment fluid component 115 is injected through mouth 135 into the container body 105, the inert flexible bladder 110 may fill by expanding the treatment fluid component portion 146. The incoming treatment fluid component may assist in evenly spreading and pressing the inert flexible bladder 110 across its outer surface 119 to the container surface 118 of the internal cavity 117, thereby contracting the metering fluid portion 147 to a very small volume. Accordingly, the inert flexible bladder 110 may extend from around the mouth 135 (but not covering the mouth), across the entire container surface 118 of the internal cavity 117. Alternatively or additionally, the mouth 135 may be part of the inert flexible bladder 110, and fastened into the container body 105. This may prevent any contact or exposure of the container surface 118 of the internal cavity 117 to the treatment fluid component 115 from mouth 135. The treatment fluid component 115 would then always be contained within the treatment fluid component portion 146 of internal cavity 117. This may protect and lengthen the life of the container body 105 while also preventing contact with a metering pumping system.

The treatment fluid component 115 may be injected into the container body 105 to prepare the completed treatment fluid or a portion thereof off-site (e.g., at the supplier or a coordinating location) and delivered via truck to the wellsite. Alternatively, additional treatment fluid components 115 may be added to the container 100 while on-site to prepare the completed treatment fluid or a portion thereof and then be used immediately or stored indefinitely for use. The treatment fluid component 115 may be pumped in a controlled way, or metered out, of the mouth 135 by pumping in, or metering in, the metering fluid 145 into the metering fluid portion 147 as shown in FIG. 1B through a metering aperture 125. A line 130 may couple with the metering aperture 125 to meter in the metering fluid 145 from a metering pump (not shown). The pumping in of the metering fluid 145 places pressure against the inert flexible bladder 110 inducing collapse toward the mouth 135, shown by collapsed portion 110*a* of the inert flexible bladder 110. The pressure differential between the treatment fluid component 115 on one side of the inert flexible bladder 110 and the metering fluid 145 on the other, caused by the introduction of the metering fluid 145 from the metering aperture 125, forces the treatment fluid component 115 out of the mouth 135. In particular, the metering of the metering fluid 145 in the metering aperture 125 causes the corresponding metering out of the treatment fluid component 115 from the mouth 135. Given that the amount introduced from the metering aperture 125 equals the amount of output from the mouth 135, the metering of the treatment fluid component 115 may be controlled with the metering pump.

The container 100 permits the treatment fluid component 115 to be kept separate from equipment that may be contaminated or damaged over time by contact with the treatment fluid component 115. The container 100 also permits the pumping equipment to only make contact with the metering fluid 145, which is kept separate from the treatment fluid component 115, and can be used to meter the treatment fluid component 115. The treatment fluid component 115 may be any fluid or solid used to prepare a treatment fluid including corrosive materials, abrasive materials, benign but hard to clean materials, oils, oil gels, etc. Other treatment fluid components 115 include, but are not limited to, base fluids such as aqueous or oleaginous fluids, gelling agents (such as liquid gel concentrate), cross-linkers, surfactants, scavengers, breakers, acids, buffering agents, caustic chemicals, liquid proppant (such as a proppant suspended in a gelling agent at a high density), gravel or other particulates, or any combinations thereof. These treatment fluid components 115 may be added to the container 100 to prepare a portion of or the completed treatment fluid.

Suitable gelling agents may include various hydratable, swellable or soluble polymer, which may include, but are not limited to, polysaccharides, guar gum, cellulose, synthetic polymers such as polyacrylate, polymethacrylate, polyacrylamide, polyvinyl alcohol, and polyvinylpyrrolidone, and derivatives thereof. Examples of crosslinkers typically comprise at least one ion that is capable of crosslinking at least two molecules. Examples of suitable crosslinkers include, but are not limited to, boric acid, borates, disodium octaborate tetrahydrate, sodium diborate, pentaborates, ulexite and colemanite, and compounds that can supply zirconium IV ions. Suitable proppants include, but are not limited to, proppants, microproppants, ultra-light weight proppants, gravel, or any fine or coarse solid particles, including, for example, sand, bauxite, ceramic, gravel, glass, polymer materials, polytetrafluoroethylene materials, nut shell pieces, cured resinous particulates having nut shell pieces, seed shell pieces, cured resinous particulates having seed shell pieces, fruit pit pieces, cured resinous particulates having fruit pit pieces, wood, composite particulates, and any combination thereof. Acids may include, but are not limited to, HCl, HF, acetic acids or other acids. Breakers may include, but are not limited to, oxides such as peroxides, hydroperoxides, hydrogen peroxide, as well as persulfates, including sodium persulfate and ammonium persulfate, as well as other breakers. The treatment fluid component may include any suitable base fluid including aqueous fluids or oleaginous fluids.

Figure 2:
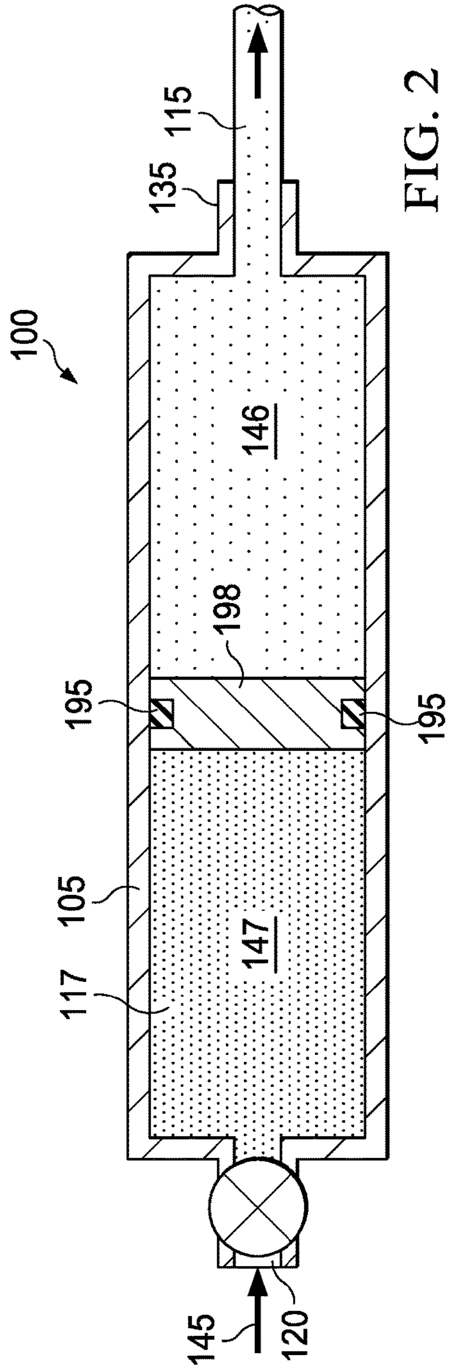
FIG. 2 is a schematic of a container where the bladder is replaced with a piston in accordance with one or more examples described herein.

Illustrated in FIG. 2 is an alternate configuration of the container 100 of FIGS. 1A and 1B. The container 100 of FIG. 2 is substantially similar to the container 100 of FIGS. 1A and 1B except that the bladder is replaced with a sealed piston 198. Internal cavity 117, disposed within body 105, still comprises both the treatment fluid component portion 146 and the metering fluid portion 147 which are disposed on opposing sides of sealed piston 198. Sealed piston 198 comprises one diameter and is of any sufficient size and shape for ejecting the treatment fluid component 115 from the container 100. The sealed piston 198 comprises piston sealing elements 195, as would be readily apparent to one of ordinary skill in the art. Sealed piston 198 comprises inert materials and therefore does not react or otherwise interfere with the treatment fluid component 115. Metering fluid 145 is metered into metering aperture 120 where it fills the metering fluid portion 147 which induces piston 198 to compress the treatment fluid component portion 146 ejecting a metered treatment fluid 115 from mouth 135 as desired.

Figure 3:
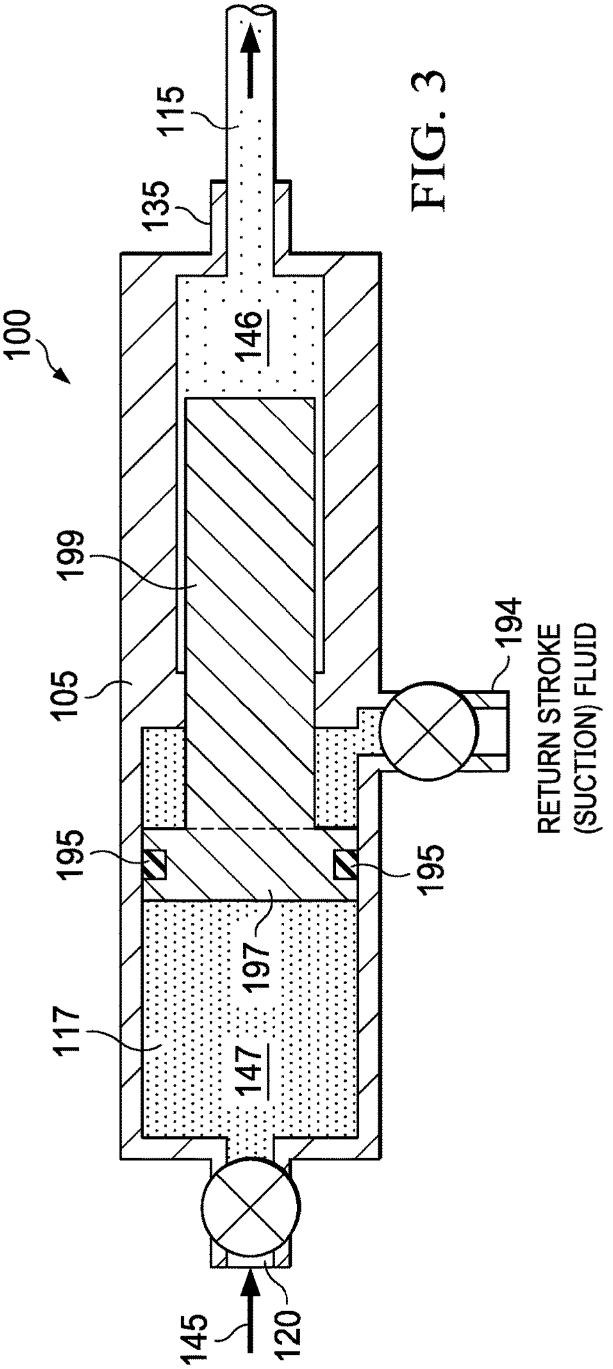
FIG. 3 is a schematic of a piston type container where the piston has dual diameters in accordance with one or more examples described herein.

Illustrated in FIG. 3 is an alternate configuration of the container 100 of FIG. 2. The container 100 of FIG. 3 is substantially similar to the container 100 of FIG. 2 except that the sealed piston 199 is of a different configuration that amplifies pressure to the treatment fluid component portion 146. The metering fluid portion 147 of the internal cavity 117 is split into two cavities each comprising a metering fluid 145 disposed on opposing sides of the head 197 of the sealed piston 199. Sealed piston 199 differs from sealed piston 198 of FIG. 2 in that sealed piston 199 comprises two diameters. Sealed piston 199 is a piston of any sufficient size and shape for ejecting the treatment fluid component 115 from the container 100. The sealed piston 199 comprises piston sealing elements 195, as would be readily apparent to one of ordinary skill in the art. Sealed piston 199 comprises inert materials and therefore does not react or otherwise interfere with the treatment fluid component 115. Metering fluid 145 is metered into metering aperture 120 where it fills the metering fluid portion 147, which induces piston 199 to compress the treatment fluid component portion 146 ejecting a metered treatment fluid 115 from mouth 135 as desired. A suction fluid outlet 194, is optionally present on one or both cavities of the metering fluid portion 147. The suction fluid outlet 194 may be used to remove metering fluid from the metering fluid portion 147 on a return stroke in some examples.

Figure 4:
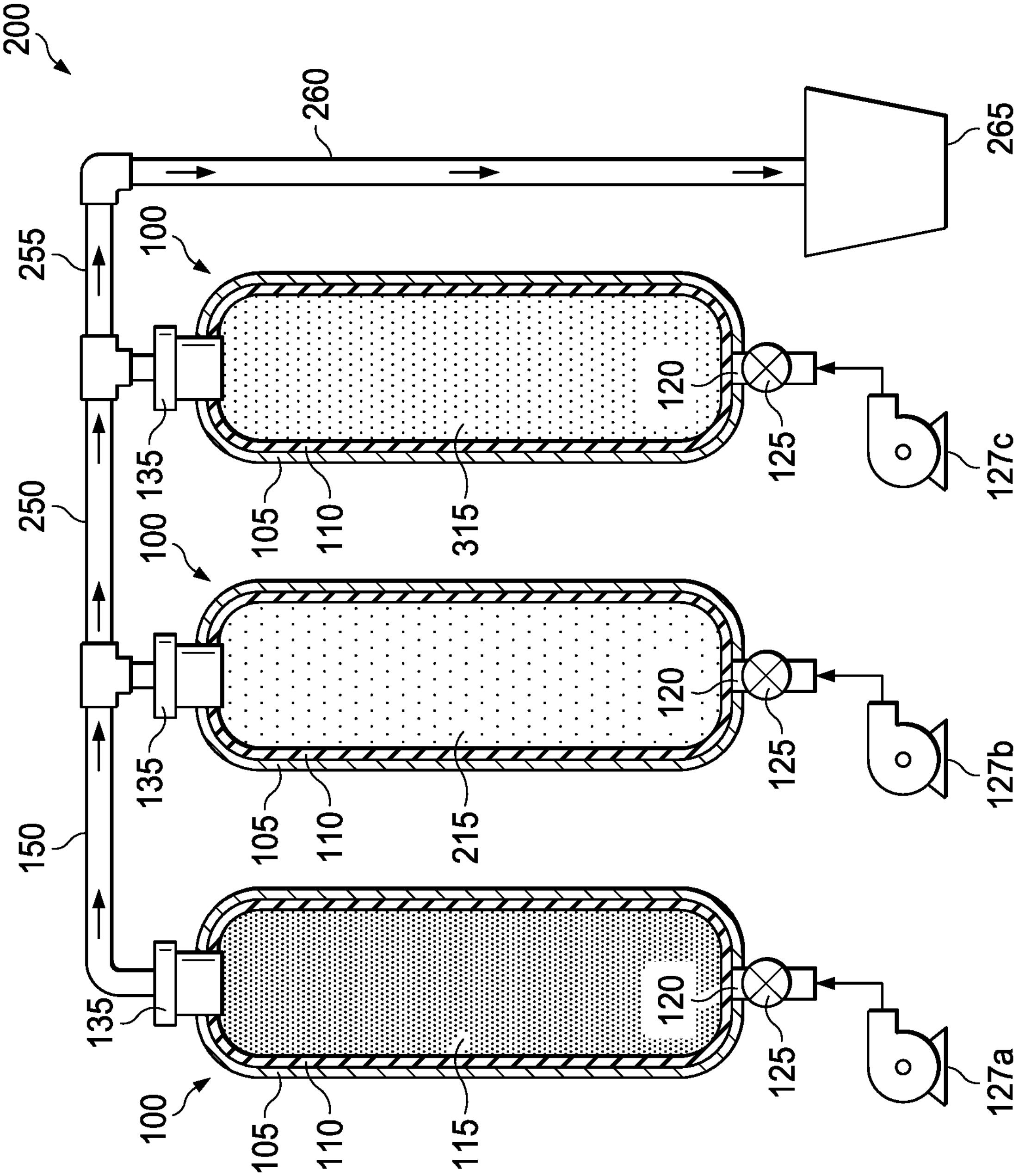
FIG. 4 is a schematic of a blending and mixing system with three containers in a series in accordance with one or more examples described herein.

Illustrated in FIG. 4 is a blending and mixing system 200, having three containers 100 in series as illustrated in FIGS. 1A and 1B. Each of the three containers 100 comprise a different treatment fluid component illustrated as either treatment fluid component 115, treatment fluid component 215, or treatment fluid component 315. Each of the treatment fluid components 115, 215, 315 may be metered/pumped from their respective exit lines 150, 250, and 255 into common line 260 where they will naturally mixed in the common line 260 and/or mixed in blending system 265. The blending system 265 may be an active blender, where power (gas or electric) is supplied to drive an impeller for mixing and blending the contents. Alternatively, each container 100 may have the same treatment fluid component, such as liquid proppant. For instance, each container 100 may have 25,000 to 35,000 pounds of liquid proppant, which may be metered out into blending system 265. The mouths 135 may have a sealed coupling with the exit lines 150, 250, and 255 so that the treatment fluid components 115, 215, and 315 may not be exposed to the atmosphere as they are metered out. This permits the use of treatment fluid components 115, 215, and 315 while avoiding exposure with the atmosphere/environment. This may also allow storage of treatment fluid components 115, 215, and 315.

Further, as shown in system 200, each container 100 may have an individual separate metering pump 127*a*, 127*b*, 127*c* coupled to the metering aperture 125. In this way, each container 100 may be independently metered to pump out the treatment fluid components 115, 215, 315 from the mouths 135 into a common line 260 in a controlled manner. In each case, a metering fluid (e.g., metering fluid 145 as illustrated in FIGS. 1A and 1B) would be pumped via the metering pumps 127*a*, 127*b*, 127*c*, which may protect such metering pumps, the surface of the internal cavities (e.g., internal cavities 117) of the containers 100, and other equipment from wear. Alternatively, a single metering pump may be coupled with each of the metering apertures 125. However, in such case less independent control may be available for metering out the treatment fluid components 115, 215, and 315 from the individual containers 100. However, in examples where the containers 100 comprise the same or similar treatment fluid components, less independent control may not be a concern for the operation.

Figure 5:
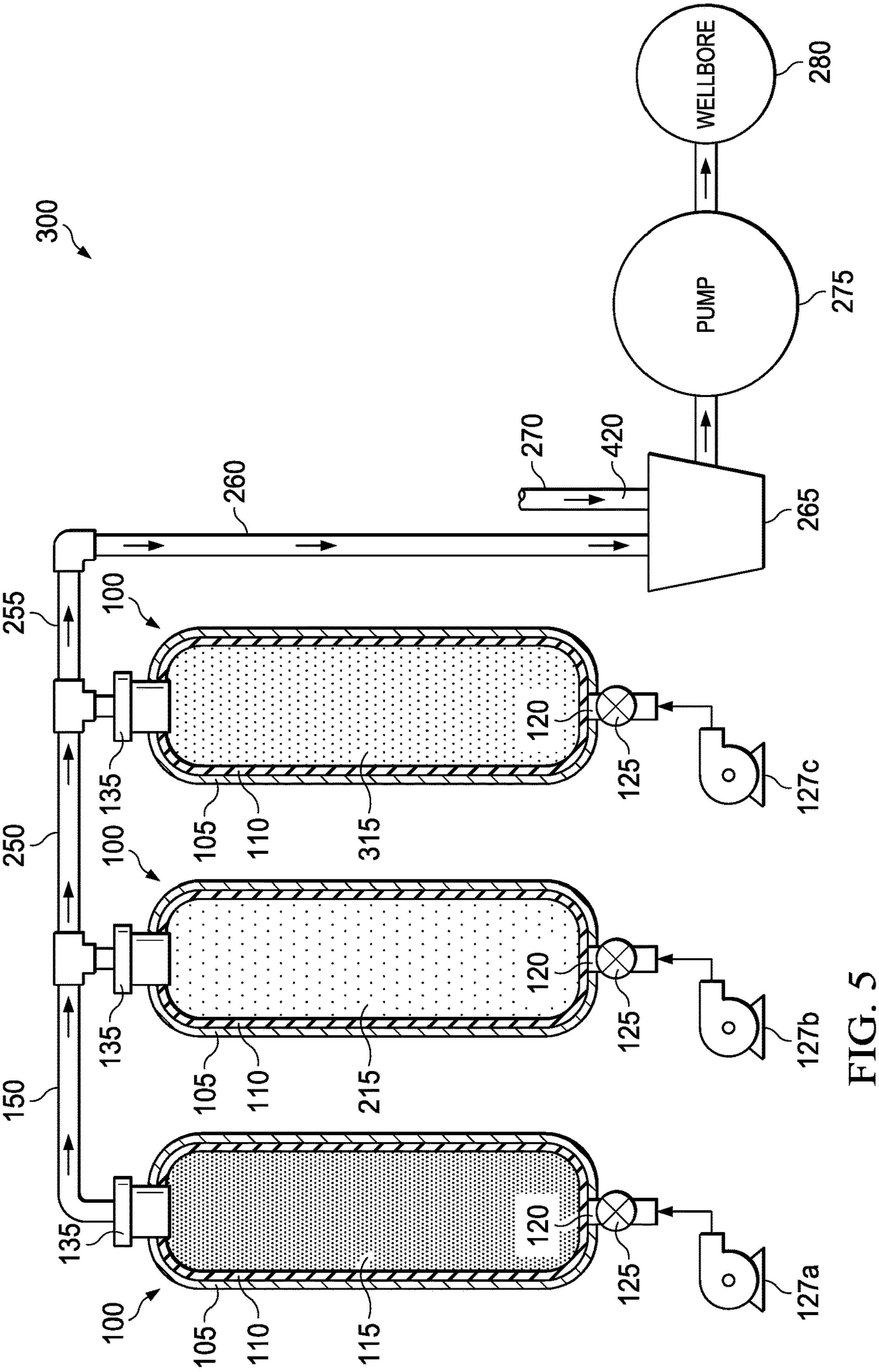
FIG. 5 is another example of a schematic of a blending and mixing system with three containers in a series in accordance with one or more examples described herein.

Illustrated in FIG. 5 is a blending and mixing system 300 comprising the same containers 100 as illustrated in FIG. 4. However, a separate line 270 of another treatment fluid component 420 may be provided to the blending system 265 thereby mixing with the treatment fluid components 115, 215, 315 from the containers 100. These are then provided to pump 275, and the mixture is then pumped down the wellbore 280.

Figure 6:
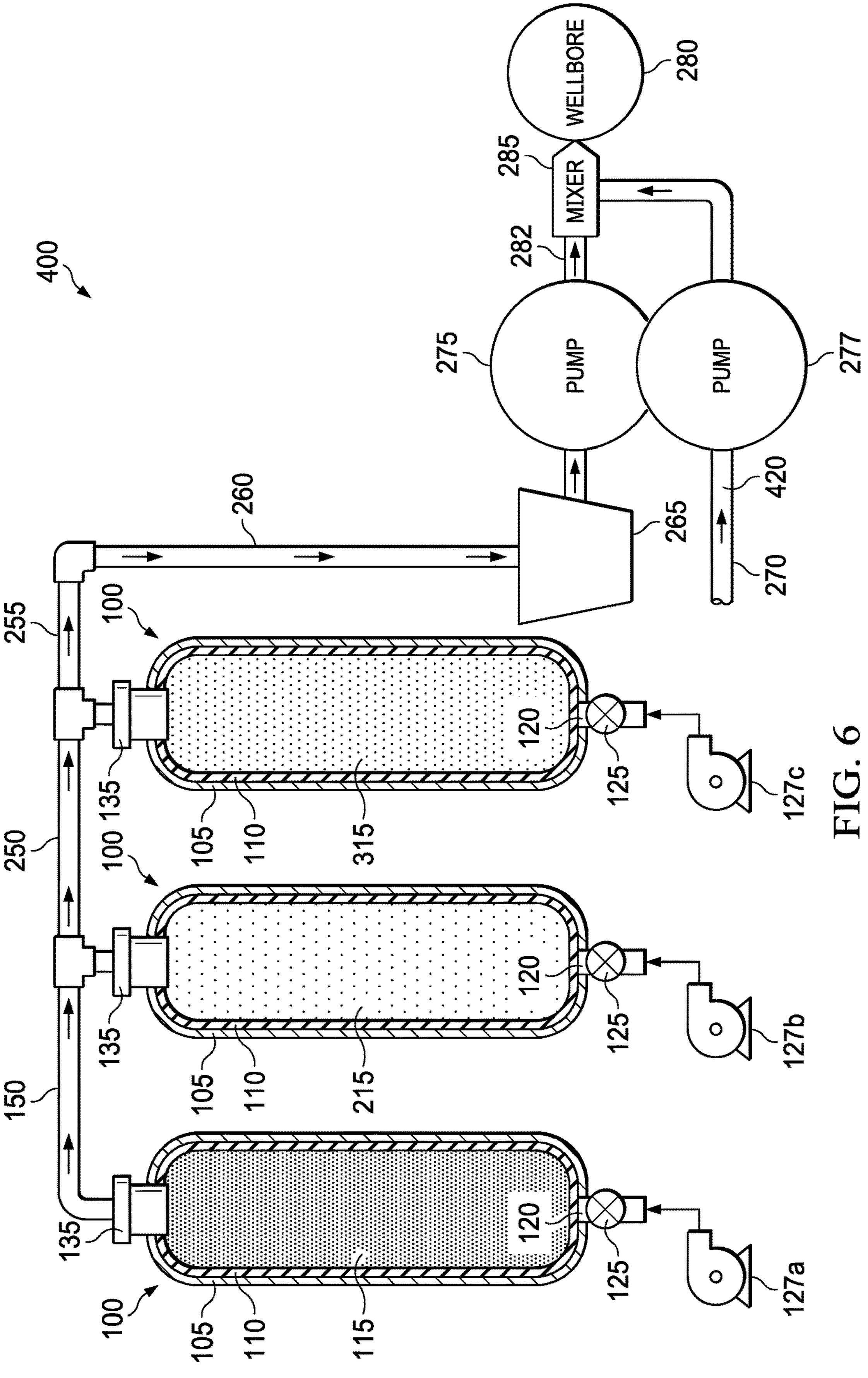
FIG. 6 is yet another example of a schematic of a blending and mixing system with three containers in a series in accordance with one or more examples described herein.

FIG. 6 illustrates a blending and mixing system 400, the components and reference numerals being the same as in FIGS. 4 and 5. However, in system 400, as compared to system 300 in FIG. 5, the other treatment fluid component 420 is provided via the separate line 270 into a separate pump 277. The treatment fluid components 115, 215, and 315 from containers 100 are provided from common line 260 through the blending system 265. The additional treatment fluid component 420 is provided via separate pump 277 along with the treatment fluid components 115, 215, and 315 pumped by pump 275 through line 282, into mixer 285. The mixer 285 may be an active mixer or a static mixer. The treatment fluid components 115, 215, and 315 along with the additional treatment fluid component 420 are mixed together via mixer 285 to provide the completed treatment fluid and injected downhole via pumps 275 and 277.

Figure 7:
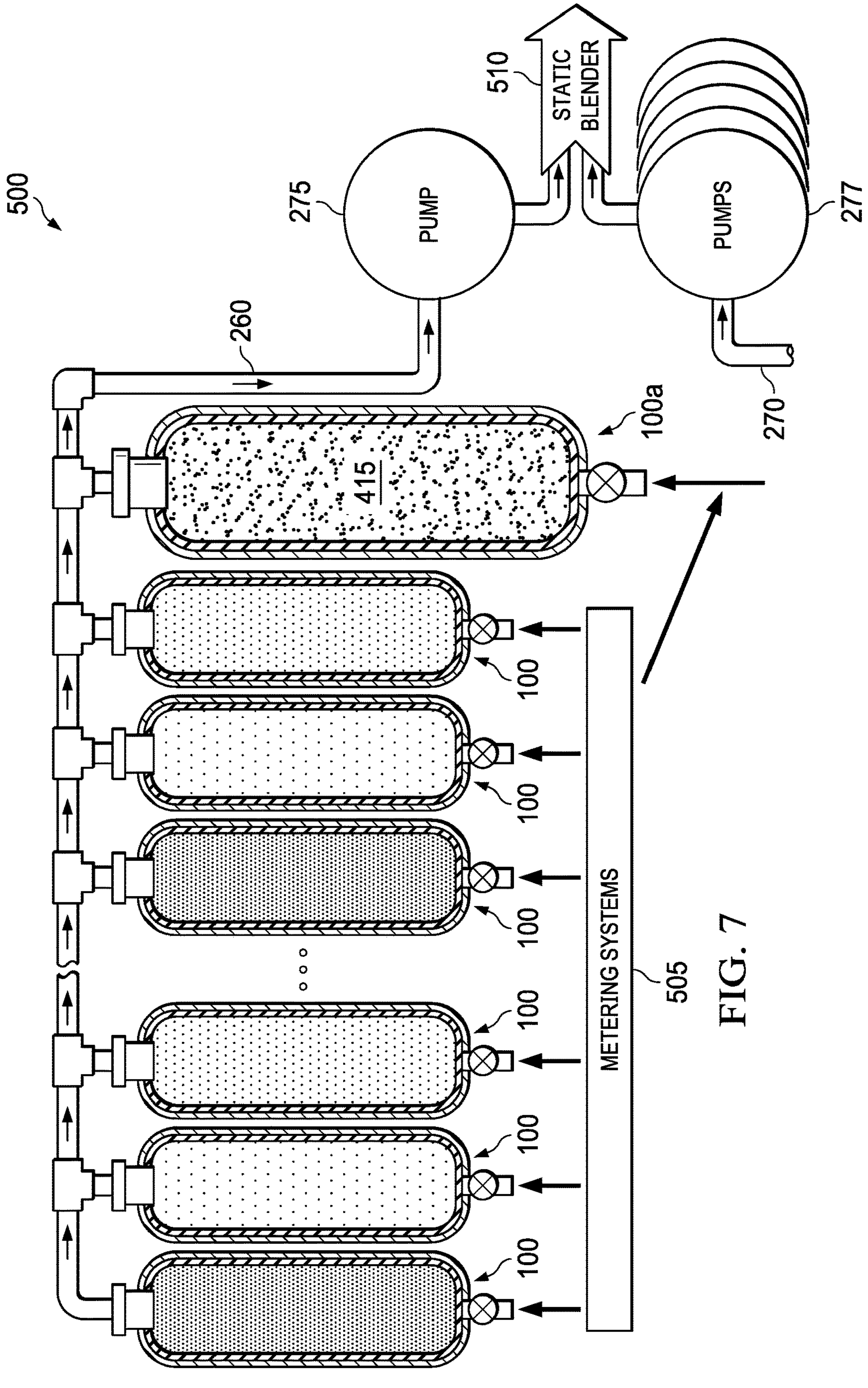
FIG. 7 is a schematic of a static blending and mixing system with several containers in a series in accordance with one or more examples described herein.

Illustrated in FIG. 7 is a static blending system 500 which may be referred to as a blenderless system in the sense that no active blender is present. In particular, the metering provided according to the containers 100 are sufficient in themselves to effectively mix without the addition of an active blender. This may improve the efficiency and costs associated with providing an active blender, and also reduce the carbon footprint. A plurality of containers as illustrated in FIGS. 1-7 can meter one or more treatment fluid components into a common line, and then into a static blender before injection into a wellbore.

As can be seen in FIG. 7, the system 500 has a plurality of containers 100 in a series. While six containers 100 are shown, there can be any number of containers 100 as desired. In system 500 each of the plurality of containers 100 contain the same or different treatment fluid component. The final container 100*a* comprises the same elements as the containers 100 but further comprises a larger size having a larger internal cavity for storage, transport, and delivery of a different treatment fluid component than that of the containers 100. Container 100*a* contains liquid sand 415, a slurry of sand and a base fluid which may be used as proppant for some wellbore operations. Each of the containers 100, may also be differently sized depending on the treatment fluid component contained therein. The metering system 505 may be a single metering pump into each of the containers 100, or each of the plurality of containers 100 may have their own individual metering pumps.

As shown, each of the plurality of containers 100 are metered into common line 260 and then pump 275. Simultaneously, another treatment fluid component is introduced via line 270 to pumps 277. The treatment fluid components from pump 275 and the additional treatment fluid component from line 270 may be pumped into static blender 510. The mixture forms a completed treatment fluid that may be introduced downhole. Accordingly, FIG. 7 shows the treatment fluid components passing from the containers 100 to a wellbore without an intervening active blender. A static blender 510 is a blender without an electrical power source and may have no moving parts such as an impeller or blade. The static blender 510 may include a shaped internal tube or barriers that cause perturbation of the fluid passing through. The static blender 510 may include a fluidic oscillator to cause sweeping or pulsing of fluids as they exit the static blender 510. The static blender 510 may include two or more types of static mixing designs in order to maximize a blending effect.

Figure 8:
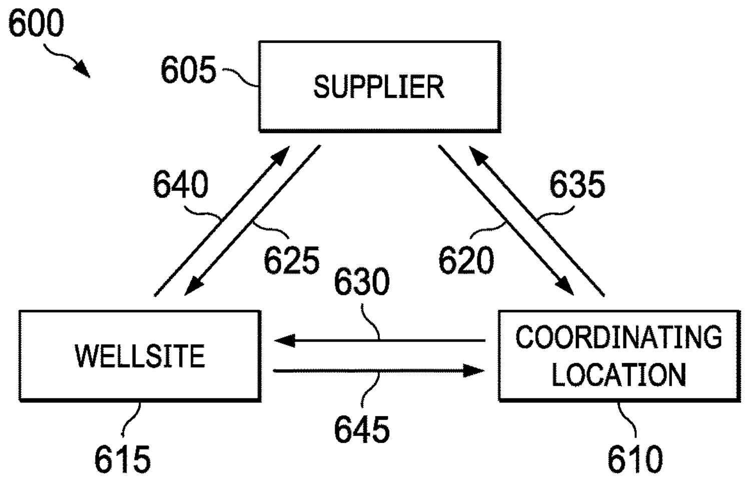
FIG. 8 is a diagram of a distribution process for the supply, transport, and delivery of containers comprising treatment fluid components in accordance with one or more examples described herein.

FIG. 8 is a diagram of a distribution process 600 for the containers described herein (e.g., any of the containers described in FIGS. 1-7). The containers may be filled at a supplier 605 and delivered to a coordinating location 610 or a wellsite 615, as indicated by arrows 620 and 625 respectively. The containers are specific to one or more treatment fluid components and sized accordingly. As such, the risk of cross-contamination is reduced, and there may be no need to clean the containers after use. After the container has arrived from the supplier 605 to either the coordinating location 610 or the wellsite 615, other treatment fluid components may be added to the container to prepare a completed treatment fluid or a portion thereof and then stored indefinitely and/or transported to a wellsite 615 if at a coordinating location 610. If the container is received at the wellsite 615, the treatment fluid component may be pumped out of the container (after optionally mixing with other treatment fluid components in the container) and, optionally, mixed with other treatment fluid components after exiting the container to provide the completed treatment fluid en route to the wellbore. The completed treatment fluid may be pumped into the wellbore.

In examples where a container is sent to a coordinating location 610, the container may be stored at the coordinating location 610 until the treatment fluid component is desired for use. Optionally, at the coordinating location 610 other treatment fluid components may be introduced to the container to prepare a complete treatment fluid or a portion thereof. After the introduction of these additional components, the container may be stored for use. When desired for use, the coordinating location 610 may send the container to the wellsite 615 to be used or stored as indicated by arrow 630. At wellsite 615 the container may be stored or the treatment fluid component may be introduced into the wellbore as described above. Other treatment fluid components may also be introduced into the container to prepare a completed treatment fluid or a portion thereof as described above. Alternatively, or in addition to, these other treatment fluid components may also be mixed with the treatment fluid component as it is metered out of the container as described above, in order to provide a completed treatment fluid for introduction into the wellbore.

After the containers have been used and emptied of their contents, they may be returned directly to the supplier 605 from either the coordinating location 610 or the wellsite 615 for refilling as indicated by arrows 635 and 640 respectively. Alternatively, the wellsite 615 may send the container back to the coordinating location 610 as indicated by arrow 645 for refilling or storage of the empty container. The containers may be refilled at the supplier 605 or the coordinating location 610 in some circumstances without cleaning. Further, as described above, the treatment fluid components or the completed treatment fluid may be stored in the containers and transported and introduced into the wellbore without the need to transfer the treatment fluid components or the completed treatment fluid to a different container. The containers may therefore be reused repeatedly without the need for cleaning or transferring the treatment fluid components to other containers. As such, the containers reduce the risk of cross-contamination and reduce complications that may arise from container transport and/or transfer.

With continued reference to FIG. 8, as a specific example, liquid sand may be supplied to the container by the supplier 605 and then shipped directly to the wellsite 615 where it may be pumped out of the container and directly into the wellbore as described above. When the container is empty, the container may be sent back to the supplier 605 and refilled. After refilling, the container may be sent back to the wellsite 615 to be used again or stored indefinitely.

As another specific example, and with continued reference to FIG. 8, sand may be supplied to the container by the supplier 605 and then shipped to a coordinating location 610 where a base fluid may be introduced to the container to prepare the liquid sand (alternatively this may also be done at the wellsite 615). The coordinating location 610 may serve as a centralized location for supply distribution to multiple wellsites 615 and may coordinate the transport, storage, refilling, and/or preparation of the treatment fluid and its components with the multiple wellsites 615. The liquid sand may be sent from the coordinating location 610 to the wellsite 615 where it may be pumped out of the container and directly into the wellbore as described above. When the container is empty, the container may be sent back to the supplier 605 from the wellsite 615 and refilled or may be sent back to the coordinating location 610. After refilling, the container may be sent back to the wellsite 615 to be used again or stored indefinitely at the supplier 605, coordinating location 610, or the wellsite 615.

Figure 9:
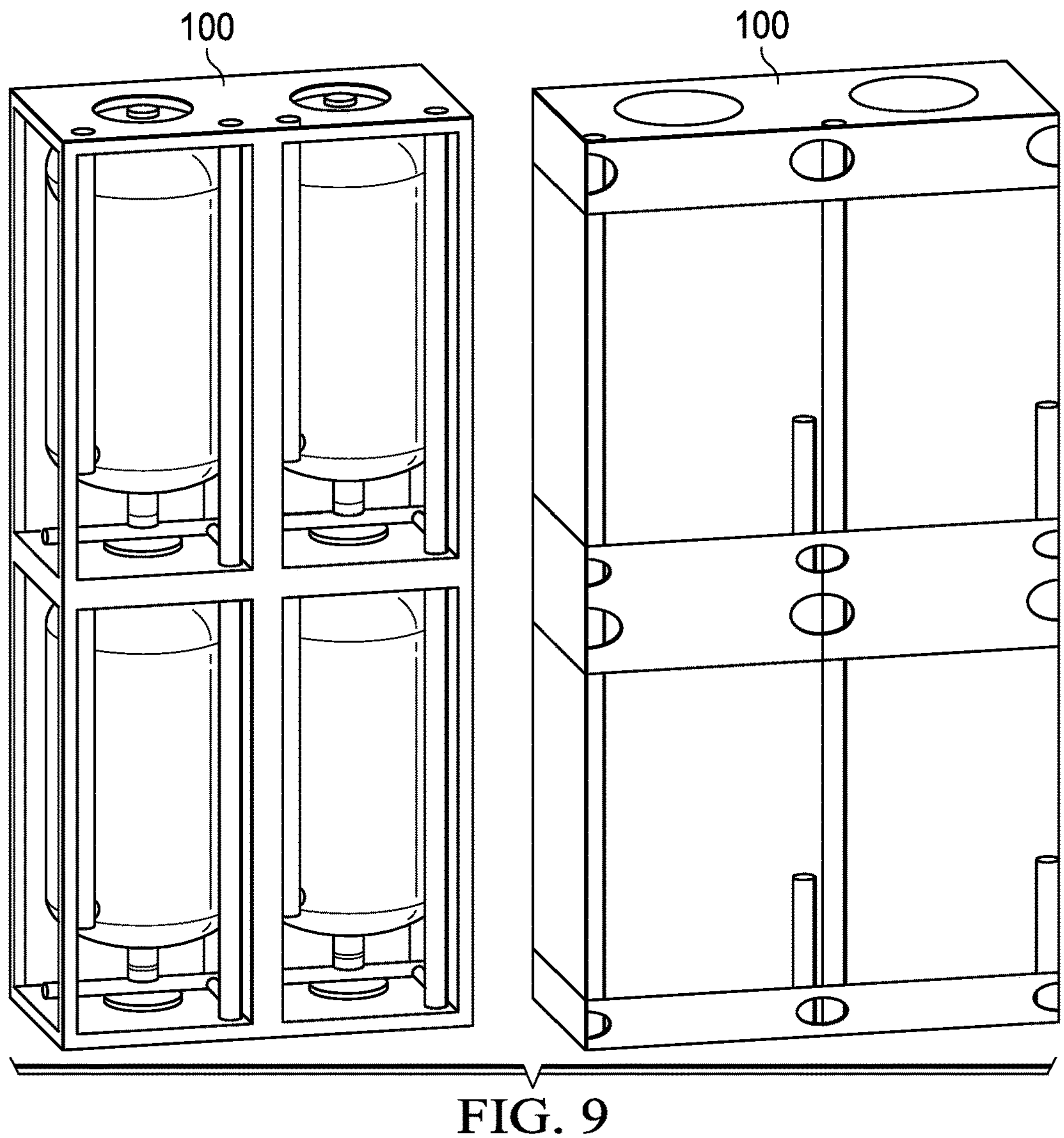
FIG. 9 is an illustration of a cross-sectional view and an isometric view of a stack of containers in accordance with one or more examples described herein.

FIG. 9 is an illustration of a cross-sectional view and an isometric view of a stack of containers 100. The containers 100 may be stacked and connected in a series as desired for the introduction of a treatment fluid component or completed treatment fluid into the wellbore. The containers 100 may also be stacked for storage. Each of the containers 100 in the stack could comprise a different treatment fluid component or completed treatment fluid. Alternatively, each of the containers 100 in the stack could comprise the same treatment fluid component or completed treatment fluid. The connected containers 100 in the stack can have the series of containers 100 arranged as desired. For example, valves such as check valves may be used to provide control over which containers 100 may be operated to release the treatment fluid component. Manual or automated operation of the valves may be used to control the containers 100 in the series so that individual containers 100 may be operated as desired, and the treatment fluid component or completed treatment fluid within said containers 100 may be metered out in the desired amount and at the desired time.

Figure 10:
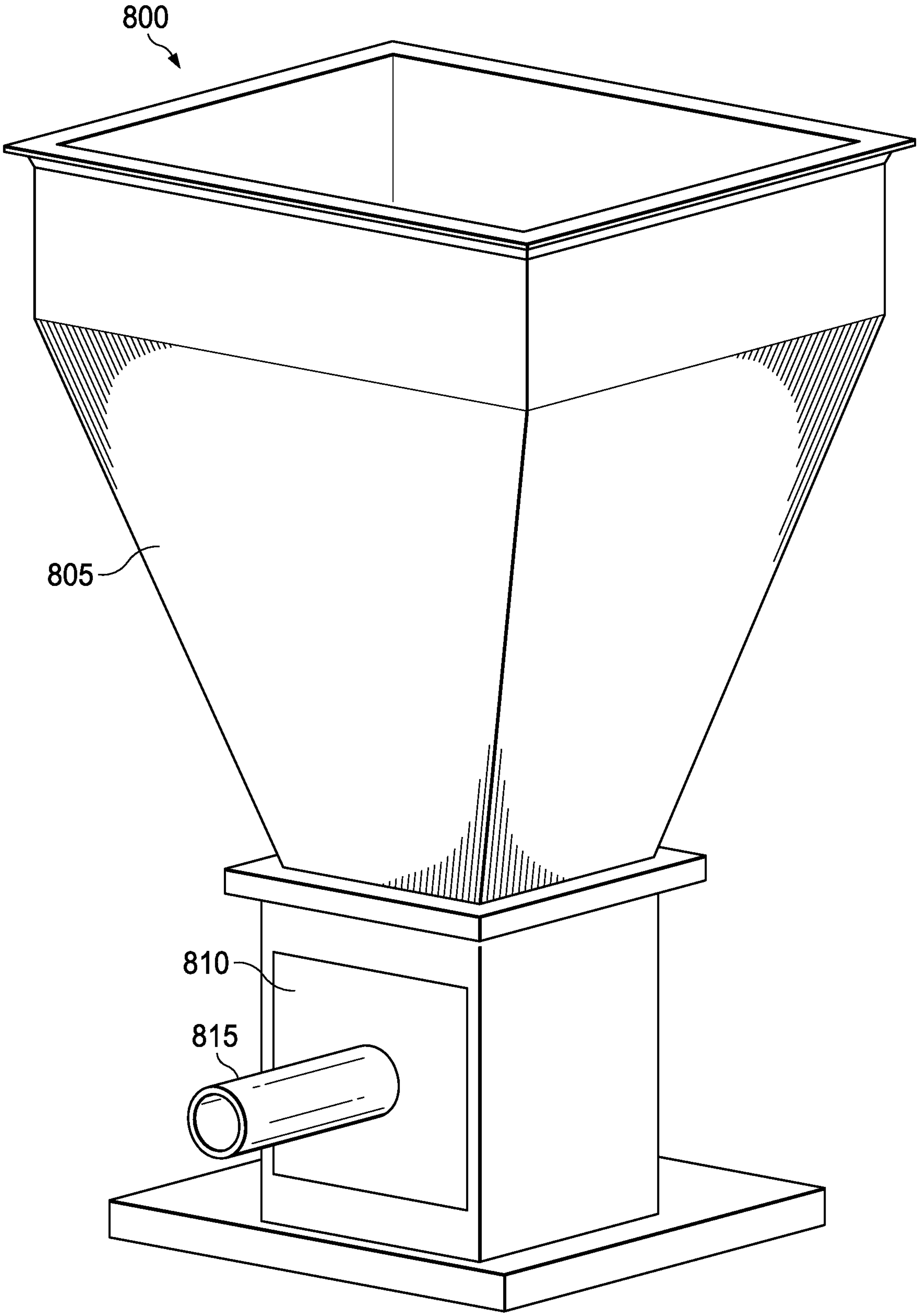
FIG. 10 is an isometric illustration of a hopper system which may be used with containers comprising solid treatment fluid components in accordance with one or more examples described herein.

FIG. 10 is an isometric illustration of a hopper system 800 for use with pressurized eductors which may be preferred in examples where the containers (e.g., containers 100 as described above) comprise solid treatment fluid components that must be maintained dry, such as oxidizing substances (e.g., sodium perchlorate). These treatment fluid components may be delivered to the hopper 805 where an auger 810 meters and pumps the treatment fluid component through an output 815 to an eductor as illustrated below.

Figure 11:
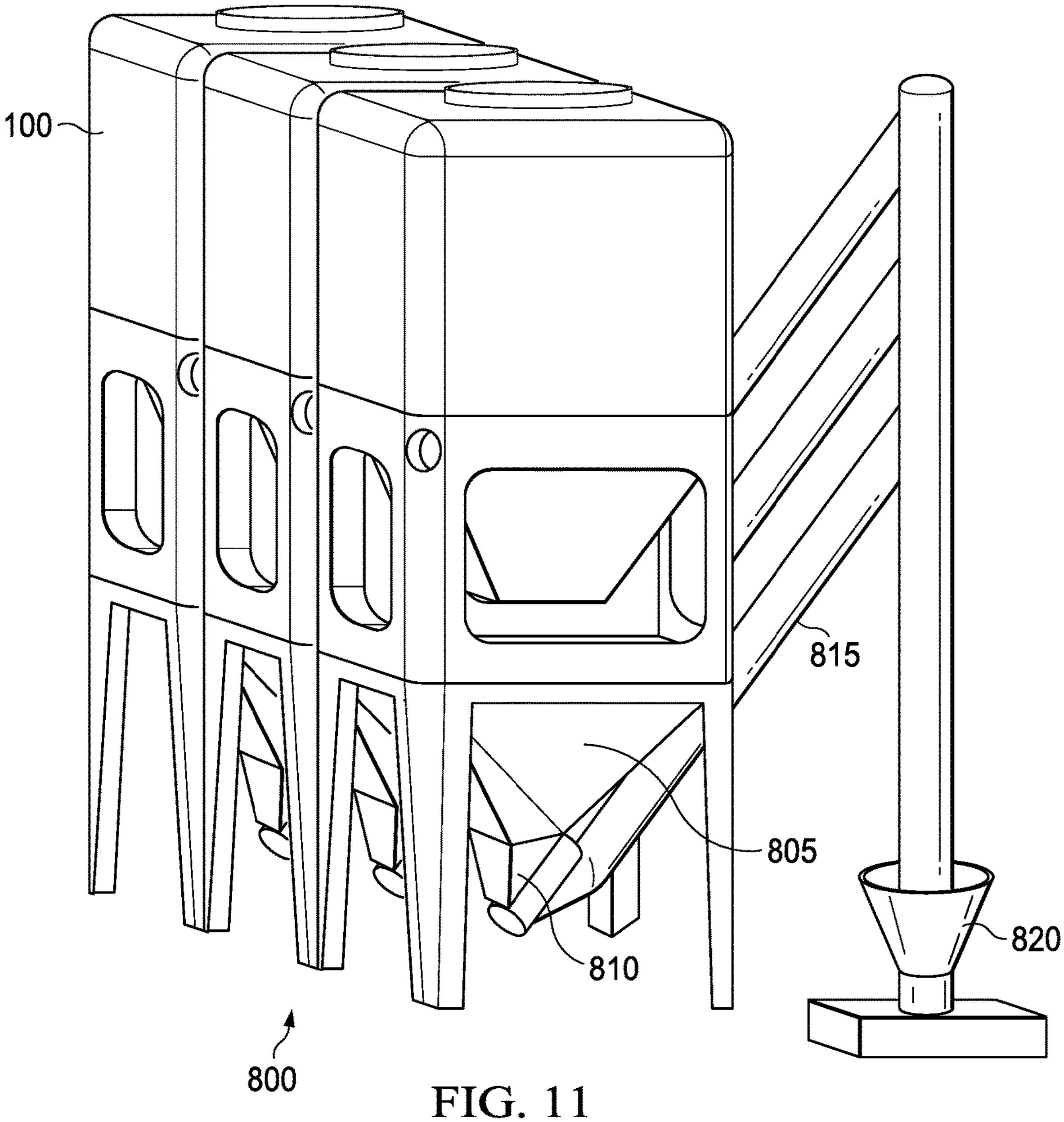
FIG. 11 is an isometric illustration of the hopper system in use with example containers and eductors.

FIG. 11 is an isometric illustration of the hopper system 800 in use with the containers 100. In this specific example, the containers 100 may have a frustum of any shape that empties into the hopper 805. In alternative examples, the containers 100 may not comprise a frustum. As described in FIG. 10, the auger 810 may meter and pump the treatment fluid component from the hopper 805 through an output 815 to an eductor 820. At the eductor 820 the treatment fluid component may be pumped and potentially mixed with other treatment fluid components to form a completed treatment fluid as desired and be introduced into the wellbore.

Figure 12:
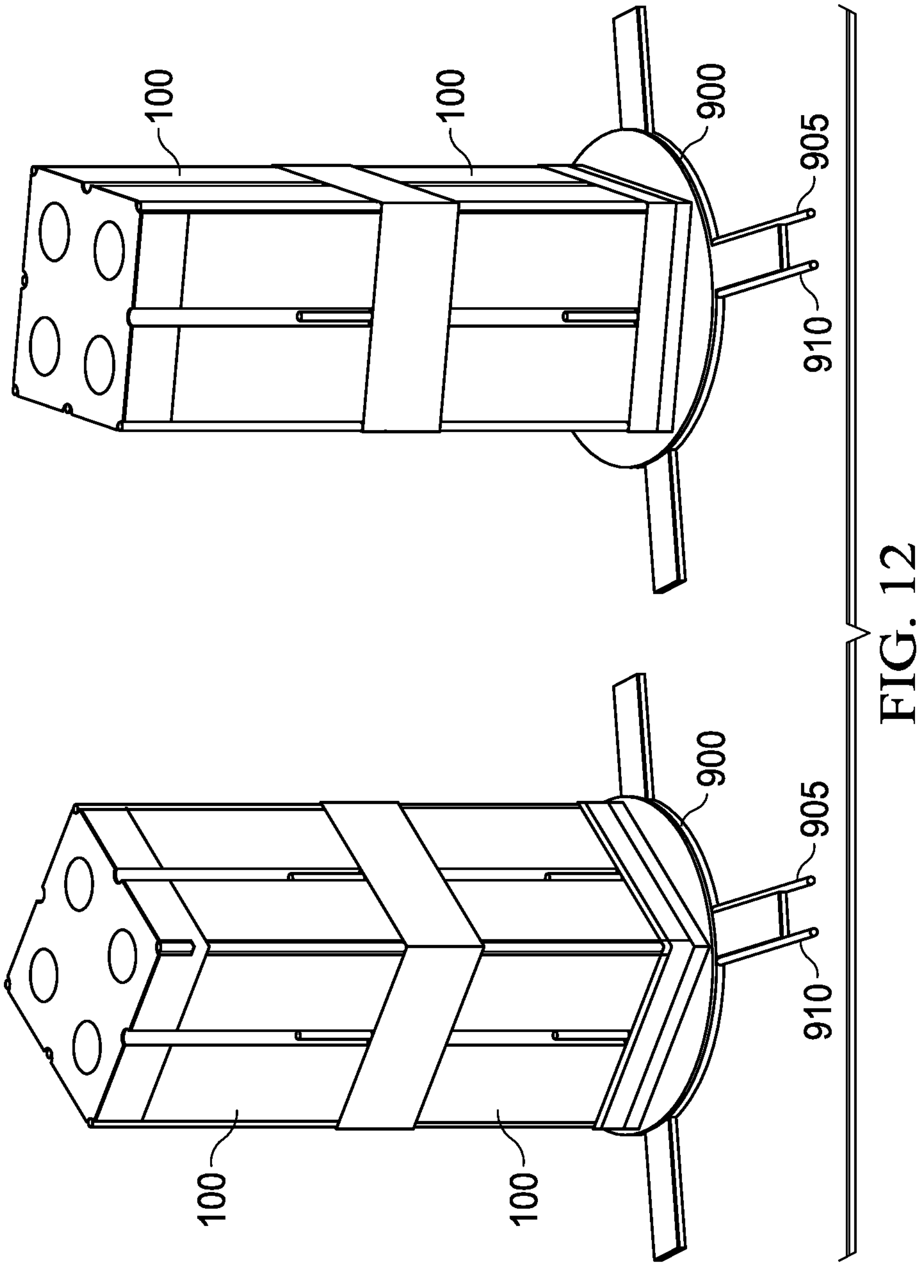
FIG. 12 illustrates isometric views of a stack of containers placed on a rotary table in accordance with one or more examples described herein.

FIG. 12 illustrates isometric views of a stack of containers 100 placed on a rotary table 900. The rotary table 900 may rotate the stack of containers 100 to connect the stack of containers to the metered fluid flow line 905 and the treatment fluid component flow line 910. As the containers 100 of one portion of the stack are emptied of their treatment fluid components, the rotary table 900 rotates full containers 100 into place where they may be connected to the metered fluid flow line 905 and the treatment fluid component flow line 910. The emptied containers 100, having been disconnected from the metered fluid flow line 905 and the treatment fluid component flow line 910, are rotated out of position and may be removed from the stack and replaced with full containers 100 allowing for continuous operation and pumping of the treatment fluid components or completed treatment fluid. Further, as the containers 100 are continuously rotated and replaced, there is no need to transfer the contents to larger containers, and multiple smaller volume containers as used to transport and store the treatment fluid components may be used.

It should be clearly understood that the examples described herein are merely illustrative applications of the principles of this disclosure in practice, and a wide variety of other examples are possible. Therefore, the scope of this disclosure is not limited at all to the details of FIGS. 1-12 as described herein.

It is also to be recognized that the disclosed methods and systems may also directly or indirectly affect the various downhole equipment and tools that may contact the treatment fluids delivered by the containers. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-12.

Provided are method of delivering a treatment fluid to a wellsite in accordance with the disclosure and the illustrated FIGs. An example method comprises receiving a container containing a treatment fluid component from a treatment fluid component supplier, and introducing the treatment fluid component into a wellbore from the container by pumping the treatment fluid component out of the container and into the wellbore; wherein the treatment fluid component is not transferred to another container during the receiving or the introducing.

Additionally or alternatively, the method may include one or more of the following features individually or in combination. The method may further comprise sending the container to the treatment fluid component supplier to be filled with the treatment fluid component. The sending the container to the treatment fluid component supplier may comprise sending a container which has already been emptied of the treatment fluid component at the wellsite. The container may not be cleaned before or after the sending the container to the treatment fluid component supplier. A coordinating location may receive the container containing the treatment fluid component from the treatment fluid component supplier. The coordinating location may transport the container to the wellsite. The coordinating location may add at least a second treatment fluid component to the container prior to transporting the container to the wellsite. The wellsite may receive the container containing the treatment fluid component from the treatment fluid component supplier. The container may comprise a container body enclosing an internal cavity for containing fluids; a mouth and a metering aperture each passing through the container body permitting fluidic communication from the internal cavity to outside the container body; and an inert component provided within the internal cavity and fluidically separating the mouth and the metering aperture, the inert component preventing contact with a surface of the internal cavity by the treatment fluid component when the treatment fluid component is introduced from the mouth, and moveable toward the mouth upon a greater differential pressure experienced from a metering fluid introduced from the metering aperture whereby the treatment fluid component is forced out of the mouth, a portion of the surface of the internal cavity being exposed to the metering fluid upon movement of the inert component. The inert component may be an inert flexible bladder; wherein the introducing the treatment fluid component into the wellbore further comprises metering the metering fluid into the internal cavity while at least a portion of the treatment fluid component is disposed in the inert flexible bladder.

Provided are method of delivering a treatment fluid to a wellsite in accordance with the disclosure and the illustrated FIGs. An example method comprises supplying a treatment fluid component, filling a container with the supplied treatment fluid component, receiving the container containing the treatment fluid component from the treatment fluid component supplier, introducing the treatment fluid component into a wellbore from the container by pumping the treatment fluid component out of the container and into the wellbore; wherein the treatment fluid component is not transferred to another container during the receiving, or the introducing, and sending the container to the treatment fluid component supplier.

Additionally or alternatively, the method may include one or more of the following features individually or in combination. The method may further comprise sending the container to the treatment fluid component supplier to be filled with the treatment fluid component. The sending the container to the treatment fluid component supplier may comprise sending a container which has already been emptied of the treatment fluid component at the wellsite. The container may not be cleaned before or after the sending the container to the treatment fluid component supplier. A coordinating location may receive the container containing the treatment fluid component from the treatment fluid component supplier. The coordinating location may transport the container to the wellsite. The coordinating location may add at least a second treatment fluid component to the container prior to transporting the container to the wellsite. The wellsite may receive the container containing the treatment fluid component from the treatment fluid component supplier. The container may comprise a container body enclosing an internal cavity for containing fluids; a mouth and a metering aperture each passing through the container body permitting fluidic communication from the internal cavity to outside the container body; and an inert component provided within the internal cavity and fluidically separating the mouth and the metering aperture, the inert component preventing contact with a surface of the internal cavity by the treatment fluid component when the treatment fluid component is introduced from the mouth, and moveable toward the mouth upon a greater differential pressure experienced from a metering fluid introduced from the metering aperture whereby the treatment fluid component is forced out of the mouth, a portion of the surface of the internal cavity being exposed to the metering fluid upon movement of the inert component. The inert component may be an inert flexible bladder; wherein the introducing the treatment fluid component into the wellbore further comprises metering the metering fluid into the internal cavity while at least a portion of the treatment fluid component is disposed in the inert flexible bladder.

Provided are systems for delivering a treatment fluid to a wellsite in accordance with the disclosure and the illustrated FIGS. An example system comprises a container comprising: a container body enclosing an internal cavity for containing fluids, a mouth and a metering aperture each passing through the container body permitting fluidic communication from the internal cavity to outside the container body, and an inert flexible bladder provided within the internal cavity and fluidically separating the mouth and the metering aperture, the inert flexible bladder preventing contact with a surface of the internal cavity by a treatment fluid component when the treatment fluid component is introduced from the mouth, and collapsible toward the mouth upon a greater differential pressure experienced from a metering fluid introduced from the metering aperture whereby the treatment fluid component is forced out of the mouth, a portion of the surface of the internal cavity being exposed to the metering fluid upon collapse of the inert flexible bladder; a treatment fluid component supplier capable of supplying the treatment fluid component; and a wellsite comprising a wellbore, the wellsite capable of receiving the container with the supplied treatment fluid component; wherein the container is capable of introducing the treatment fluid component into the wellbore from the container by pumping the treatment fluid component out of the container and into the wellbore.

Additionally or alternatively, the method may include one or more of the following features individually or in combination. The container may be capable of being refilled and reused without cleaning. The system may further comprise a coordinating location capable of receiving the container with the supplied treatment fluid component. The system may further comprise sending the container to the treatment fluid component supplier to be filled with the treatment fluid component. The sending the container to the treatment fluid component supplier may comprise sending a container which has already been emptied of the treatment fluid component at the wellsite. The container may not be cleaned before or after the sending the container to the treatment fluid component supplier. A coordinating location may receive the container containing the treatment fluid component from the treatment fluid component supplier. The coordinating location may transport the container to the wellsite. The coordinating location may add at least a second treatment fluid component to the container prior to transporting the container to the wellsite. The wellsite may receive the container containing the treatment fluid component from the treatment fluid component supplier.

Provided are systems for delivering a treatment fluid to a wellsite in accordance with the disclosure and the illustrated FIGS. An example system comprises a container comprising: a container body enclosing an internal cavity for containing fluids, a mouth and a metering aperture each passing through the container body permitting fluidic communication from the internal cavity to outside the container body, and a piston with one or two diameters provided within the internal cavity and fluidically separating the mouth and the metering aperture, the piston preventing contact of a treatment fluid component and a metering fluid introduced from the metering aperture whereby the treatment fluid component is forced out of the mouth, a treatment fluid component supplier capable of supplying the treatment fluid component; a wellsite comprising a wellbore, the wellsite capable of receiving the container with the supplied treatment fluid component; wherein the container is capable of introducing the treatment fluid component into the wellbore from the container by pumping the treatment fluid component out of the container and into the wellbore.

Additionally or alternatively, the method may include one or more of the following features individually or in combination. The container may be capable of being refilled and reused without cleaning. The system may further comprise a coordinating location capable of receiving the container with the supplied treatment fluid component. The system may further comprise sending the container to the treatment fluid component supplier to be filled with the treatment fluid component. The sending the container to the treatment fluid component supplier may comprise sending a container which has already been emptied of the treatment fluid component at the wellsite. The container may not be cleaned before or after the sending the container to the treatment fluid component supplier. A coordinating location may receive the container containing the treatment fluid component from the treatment fluid component supplier. The coordinating location may transport the container to the wellsite. The coordinating location may add at least a second treatment fluid component to the container prior to transporting the container to the wellsite. The wellsite may receive the container containing the treatment fluid component from the treatment fluid component supplier.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of delivering a treatment fluid to a wellsite, the method comprising:

receiving a container containing a treatment fluid component from a treatment fluid component supplier, and introducing the treatment fluid component into a wellbore from the container by pumping the treatment fluid component out of the container with a first pump and then to a second pump configured to pump the treatment fluid component into the wellbore; wherein the treatment fluid component is not transferred to another container during the receiving or the introducing; wherein the treatment fluid container comprises a pressure rating of about 10 psi to about 1000 psi, wherein a coordinating location receives the container containing the treatment fluid component from the treatment fluid component supplier; wherein the coordinating location transports the container to the wellsite; wherein the coordinating location adds at least a second treatment fluid component to the container prior to transporting the container to the wellsite.

2. The method of claim 1, further comprising sending the container to the treatment fluid component supplier to be filled with the treatment fluid component.

3. The method of claim 2, wherein the sending the container to the treatment fluid component supplier comprises sending a container which has already been emptied of the treatment fluid component at the wellsite.

4. The method of claim 3, wherein the container is not cleaned before or after the sending the container to the treatment fluid component supplier.

5. The method of claim 1, wherein the container comprises:

a container body enclosing an internal cavity for containing fluids;

a mouth and a metering aperture each passing through the container body permitting fluidic communication from the internal cavity to outside the container body; and an inert component provided within the internal cavity and fluidically separating the mouth and the metering aperture, the inert component preventing contact with a surface of the internal cavity by the treatment fluid component when the treatment fluid component is introduced from the mouth, and moveable toward the mouth upon a greater differential pressure experienced from a metering fluid introduced from the metering aperture whereby the treatment fluid component is forced out of the mouth, a portion of the surface of the internal cavity being exposed to the metering fluid upon movement of the inert component.

6. The method of claim 5, wherein the inert component is an inert flexible bladder; wherein the introducing the treatment fluid component into the wellbore further comprises metering the metering fluid into the internal cavity while at least a portion of the treatment fluid component is disposed in the inert flexible bladder.

7. A method of delivering a treatment fluid to a wellsite, the method comprising:

supplying a treatment fluid component from a treatment fluid component supplier, filling a container with the supplied treatment fluid component, wherein the container comprises:

a container body enclosing an internal cavity for containing fluids, a mouth and a metering aperture each passing through the container body permitting fluidic communication from the internal cavity to outside the container body, and an inert component provided within the internal cavity and fluidically separating the mouth and the metering aperture, the inert component preventing contact with a surface of the internal cavity by the treatment fluid component when the treatment fluid component is introduced from the mouth, and moveable toward the mouth upon a greater differential pressure experienced from a metering fluid introduced from the metering aperture whereby the treatment fluid component is forced out of the mouth, a portion of the surface of the internal cavity being exposed to the metering fluid upon movement of the inert component, receiving the container containing the treatment fluid component from the treatment fluid component supplier, introducing the treatment fluid component into a wellbore from the container by pumping the treatment fluid component out of the container with a first pump and then to a second pump configured to pump the treatment fluid component into the wellbore; wherein the treatment fluid component is not transferred to another container during the receiving, or the introducing; wherein the treatment fluid container comprises a pressure rating of about 10 psi to about 1000 psi, and sending the container to the treatment fluid component supplier.

8. The method of claim 7, wherein the container is not cleaned before or after the sending the container to the treatment fluid component supplier.

9. The method of claim 7, wherein a coordinating location receives the container containing the treatment fluid component from the treatment fluid component supplier.

10. The method of claim 9, wherein the coordinating location transports the container to the wellsite.

11. The method of claim 10, wherein the coordinating location adds at least a second treatment fluid component to the container prior to transporting the container to the wellsite.

12. The method of claim 7, wherein the wellsite receives the container containing the treatment fluid component from the treatment fluid component supplier.

13. A system for delivering a treatment fluid to a wellsite, the system comprising:

a container comprising:

a container body enclosing an internal cavity for containing fluids; wherein the treatment fluid container comprises a pressure rating of about 10 psi to about 1000 psi, a mouth and a metering aperture each passing through the container body permitting fluidic communication from the internal cavity to outside the container body, and an inert flexible bladder provided within the internal cavity and fluidically separating the mouth and the metering aperture, the inert flexible bladder preventing contact with a surface of the internal cavity by a treatment fluid component when the treatment fluid component is introduced from the mouth, and collapsible toward the mouth upon a greater differential pressure experienced from a metering fluid introduced from the metering aperture whereby the treatment fluid component is forced out of the mouth, a portion of the surface of the internal cavity being exposed to the metering fluid upon collapse of the inert flexible bladder;

a treatment fluid component supplier capable of supplying the treatment fluid component; and a wellsite comprising a wellbore, the wellsite capable of receiving the container with the supplied treatment fluid component;

wherein the container is capable of introducing the treatment fluid component into the wellbore from the container by pumping the treatment fluid component out of the container with a first pump and then to a second pump configured to pump the treatment fluid component into the wellbore.

14. The system of claim 13, wherein the container is capable of being refilled and reused without cleaning.

15. The system of claim 13, further comprising a coordinating location capable of receiving the container with the supplied treatment fluid component.

16. The system of claim 15, wherein the coordinating location adds at least a second treatment fluid component to the container prior to transporting the container to the wellsite.

17. A system for delivering a treatment fluid to a wellsite, the system comprising:

a container comprising:

a container body enclosing an internal cavity for containing fluids; wherein the treatment fluid container comprises a pressure rating of about 10 psi to about 1000 psi, a mouth and a metering aperture each passing through the container body permitting fluidic communication from the internal cavity to outside the container body, and a piston with one or two diameters provided within the internal cavity and fluidically separating the mouth and the metering aperture, the piston preventing contact of a treatment fluid component and a metering fluid introduced from the metering aperture whereby the treatment fluid component is forced out of the mouth, a treatment fluid component supplier capable of supplying the treatment fluid component;

a wellsite comprising a wellbore, the wellsite capable of receiving the container with the supplied treatment fluid component;

wherein the container is capable of introducing the treatment fluid component into the wellbore from the container by pumping the treatment fluid component out of the container with a first pump and then to a second pump configured to pump the treatment fluid component into the wellbore.

18. The system of claim 17, wherein the container is capable of being refilled and reused without cleaning.

19. The system of claim 17, further comprising a coordinating location capable of receiving the container with the supplied treatment fluid component.

20. The system of claim 19, wherein the coordinating location adds at least a second treatment fluid component to the container prior to transporting the container to the wellsite.

* * * * *